United States Patent
Roh et al.

(10) Patent No.: US 8,084,631 B2
(45) Date of Patent: Dec. 27, 2011

(54) POLYOL FORMED FROM AN EPOXIDIZED OIL

(75) Inventors: Yeonsuk Roh, Canton, MI (US); Rajesh Kumar, Riverview, MI (US); Cheng-Le Zhao, Northville, MI (US); David Kaczan, Southgate, MI (US); Theodore M. Smiecinski, Woodhaven, MI (US)

(73) Assignee: BASF SE, Rheinland-Pfalz (DE)

( * ) Notice: Subject to any disclaimer, the term of this patent is extended or adjusted under 35 U.S.C. 154(b) by 577 days.

(21) Appl. No.: 12/121,609

(22) Filed: May 15, 2008

(65) Prior Publication Data

US 2009/0286896 A1    Nov. 19, 2009

(51) Int. Cl.
*C07D 303/02*    (2006.01)

(52) U.S. Cl. ........ 549/513; 549/525; 554/149; 554/168; 554/227; 554/228

(58) Field of Classification Search .................. 554/149, 554/168, 227, 228; 549/513, 525
See application file for complete search history.

(56) References Cited

U.S. PATENT DOCUMENTS

| | | |
|---|---|---|
| 2,909,537 A | 10/1959 | Chatfield |
| 3,637,618 A | 1/1972 | May |
| 3,979,270 A | 9/1976 | Trecker et al. |
| 4,016,059 A | 4/1977 | Trecker et al. |
| 4,025,477 A * | 5/1977 | Borden et al. .................. 528/73 |
| 4,118,405 A | 10/1978 | Hodakowski et al. |
| 4,119,640 A | 10/1978 | Hodakowski et al. |
| 5,266,714 A | 11/1993 | Stoll et al. |
| 5,302,626 A | 4/1994 | Hoefer et al. |
| 6,107,433 A | 8/2000 | Petrovic et al. |
| 6,121,398 A | 9/2000 | Wool et al. |
| 6,433,121 B1 | 8/2002 | Petrovic et al. |
| 2004/0258635 A1 | 12/2004 | Harry-O'Kuru |
| 2006/0041157 A1 * | 2/2006 | Petrovic et al. ............... 554/149 |
| 2007/0265459 A1 | 11/2007 | Suppes et al. |

FOREIGN PATENT DOCUMENTS

| | | |
|---|---|---|
| WO | 2006012344 A1 | 2/2006 |
| WO | 2006116456 A1 | 11/2006 |
| WO | 2007019051 A1 | 2/2007 |

OTHER PUBLICATIONS

International Search Report for PCT/EP2009/055742, dated Oct. 30, 2009, 3 pages.
Guo et al., "Structure and Properties of Halogenated and Nonhalogenated Soy-Based Polyols", Journal of Polymer Science: Part A: Polymer Chemistry, vol. 38, 3900-3910 (2000); Aug. 7, 2000, 11pp.
Nevin, et al. "Vinyl Oil Monomers. I. Vicinal Methacryloxy-Hydroxy Soy Oils", Journal of Applied Polymer Science, vol. 7, pp. 1853-1866 (1963), 14 pp.

* cited by examiner

*Primary Examiner* — John Cooney
(74) *Attorney, Agent, or Firm* — Howard & Howard Attorneys PLLC

(57) ABSTRACT

A polyol includes the reaction product of an epoxidized oil and an organic acid. The epoxidized oil and the organic acid are reacted in the presence of a Lewis base catalyst including at least one of a phosphorous atom or a nitrogen atom. The polyol is formed by a method that includes the step of reacting the epoxidized oil with the organic acid in the presence of the Lewis base catalyst.

12 Claims, 4 Drawing Sheets

Exemplary Soy Bean Oil
Average Functionality = 4.6
Approximate Number and Weight Average Molecular Weights = 872 g/mol Exemplary Epoxidized Soy Oil
3-(8-(3-octyloxiran-2-yl)octanoyloxy)propane-1,2-diyl bis(8-(3-((3-pentyloxiran-2-yl)methyl)oxiran-2-yl)octanoate)

Possible Structure of Polyols 1 and 2

Possible Structure of Polyol 3

POLYOL FORMED FROM AN EPOXIDIZED OIL

FIELD OF THE INVENTION

The present invention generally relates to a polyol and a method of forming the polyol. More specifically, the polyol is the reaction product of an epoxidized oil and an organic acid which are reacted in the presence of a Lewis base catalyst.

DESCRIPTION OF THE RELATED ART

Formation of polyols using different methods is well known in the art. Specific types of polyols, e.g. those formed from epoxidized compounds, are also well known. These epoxidized compounds may have long chain hydrocarbon backbones, ester functionality, and internal and/or terminal epoxy groups.

The epoxidized compounds having terminal epoxy groups are known to react with a variety of curatives and hardeners such as primary, secondary, and tertiary amines, anhydrides, polyamides, boron trifluoride-monoethylamine complexes, dicyandiamides, polysulfides, and thiols. Protic curatives, such as primary and secondary amines having the formula RR'NH wherein R is alkyl group and R' is either a hydrogen atom or an alkyl group, react with epoxidized compounds through addition reactions wherein one nitrogen-hydrogen group reacts with one epoxy group of the epoxidized compound. This reaction is thought to proceed via a primary or second amine attacking the terminal epoxy group resulting in ring opening and the production of a zwitterion. The zwitterion is capable of reacting with another epoxy group and opening the ring. It is believed that this type of reaction continues until a dense cross-linked structure including stable ether linkages is formed, as represented by the generic chemical reaction scheme and mechanism shown below:

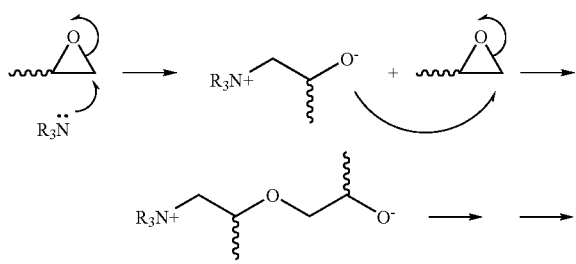

These types of reactions proceed readily because the amine attacks a terminal epoxy group with minimal steric hindrance. However, if the epoxidized compounds have internal, i.e., non-terminal epoxy groups, ring opening reactions are much more difficult due to steric hindrance of surrounding groups such as aliphatic groups. These surrounding groups render internal epoxy groups much less reactive towards traditional ring opening polymerization reactants.

When epoxidized compounds having both internal and external epoxy groups are reacted to form polyols, a number of different products are formed due to both kinetic and thermodynamic considerations. This causes a final product to have a wide polydispersity index, which is calculated as a weight average molecular weight of the polyol divided by a number average molecular weight of the polyol. The polydispersity index represents a distribution of individual molecular masses of molecules of the polyol. As length and size of each molecule of the polyol approach uniformity, the polydispersity index approaches 1.0. The technology currently known in the art reacts epoxy groups according to the mechanism described above and tends to cause a viscosity of the final product to increase due to the formation of the dense cross-linked structure. This also increases the polydispersity index. In many applications, these increases in viscosity and polydispersity indices are unacceptable. Accordingly, there remains an opportunity to develop improved polyols and an improved method of forming the polyols.

SUMMARY OF THE INVENTION AND ADVANTAGES

The present invention provides a polyol and a method of forming the polyol. The polyol is the reaction product of an epoxidized oil and an organic acid. The epoxidized oil and the organic acid are reacted in the presence of a Lewis base catalyst. The Lewis base catalyst includes at least one of a phosphorous atom or a nitrogen atom. The method of forming the polyol includes reacting the epoxidized oil with the organic acid in the presence of the Lewis base catalyst to form the polyol.

The particular Lewis base catalyst used in the present invention allows the organic acid to react with the epoxidized oil to form a polyol having hydroxyl groups and ester functionality in an efficient, accurate, and consistent manner. The Lewis base catalyst also facilitates ring opening of internal epoxy groups of the epoxidized oil while preserving other functional groups of the epoxidized oil, such as triglyceride ester skeletons. This ring opening allows the polyol to gain additional hydroxyl groups and also allows for the customization of polyols with different functionalities. Further, the instant method minimizes the formation of cross-linked structures and produces less viscous polyols with narrowed ranges of polydispersity indices which are suitable for use in a wide variety of applications. Still further, the instant invention allows the polyol to be formed in an efficient and accurate manner while minimizing production costs and maximizing consistency.

BRIEF DESCRIPTION OF THE SEVERAL VIEWS OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

The instant invention provides a polyol and a method of forming the polyol. The polyol includes the reaction product of an epoxidized oil and an organic acid. In one embodiment, the polyol consists essentially of the reaction product of the epoxidized oil and the organic acid. This embodiment does not include additional reactants that react with the epoxidized oil and/or the organic acid because these additional reactants would materially affect the basic and novel characteristic of the polyol. In another embodiment, the polyol consists of the reaction product of the epoxidized oil and the organic acid. The epoxidized oil and the organic acid are reacted in the presence of a Lewis base catalyst. The Lewis base catalyst includes at least one of a phosphorous atom or a nitrogen atom. The organic acid and the Lewis base catalyst are described in greater detail below.

The epoxidized oil may be formed from any natural or synthetic oil and has at least one epoxy group. As is known in the art, epoxy groups are cyclic ethers with only three atoms in a ring. The ring forms an approximately equilateral triangle with bond angles of about 60°, making the ring highly strained. This strain causes the epoxy groups to be very reactive towards nucleophiles. The epoxidized oil may have both internal and terminal epoxy groups in any number. The epoxy groups may be symmetric and/or asymmetric epoxy groups such as those shown below:

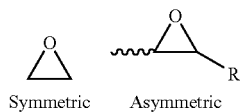

Symmetric    Asymmetric wherein R is an organic or inorganic group.

In one embodiment, the epoxidized oil is formed from a natural oil, e.g. an oil derived from an animal or plant. One type of natural oil derived from a plant is vegetable oil. Suitable non-limiting examples of oils that may be epoxidized include oils that have from 1 to 3 non-conjugated carbon-carbon double bonds such as chicken fat, canola oil, citrus seed oil, cocoa butter, corn oil, cottonseed oil, linseed oil, oat oil, olive oil, palm oil, peanut oil, rapeseed oil, rice brain oil, safflower oil, sesame oil, soybean oil, sunflower oil, beef tallow, and combinations thereof. In one embodiment, the oil that is epoxidized includes a high proportion of unsaturated constituent fatty acids. Typically, the epoxidized oil is derived from an animal or plant and reacted with a peracid, a perester, and/or a peroxide to form epoxy groups at sites of carbon-carbon double bonds. However, the epoxidized oil is not limited to formation by such means. Preferably, the epoxidized oil has a viscosity of from 300 to 700, more preferably of from 400 to 600, and most preferably of about 600, cps at 25° C. using a Brookfield Viscometer and a 21 spindle. Of course, the epoxidized oil is not limited to such viscosities.

Figure 1A:
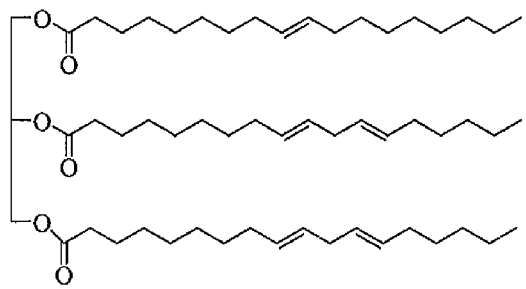
FIG. 1A is a diagram of a chemical structure of an exemplary soybean oil.
Figure 1B:
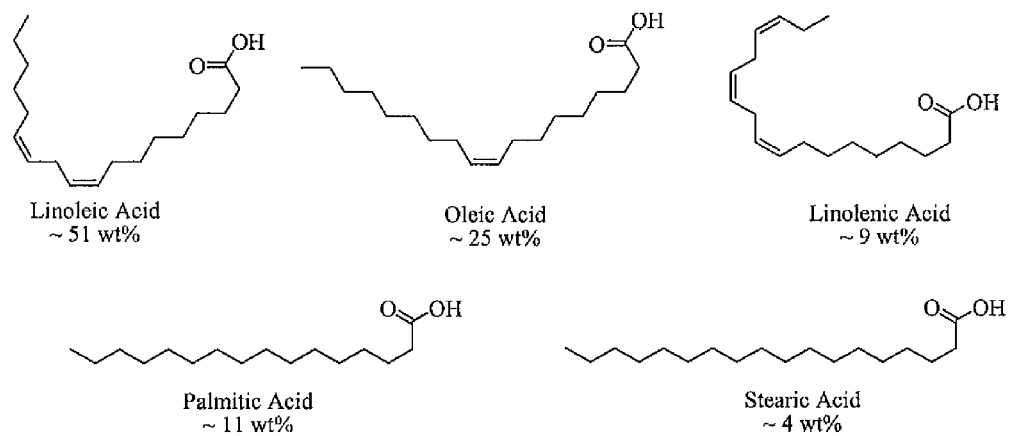
FIG. 1B is a diagram of chemical structures and typical weight percents of constituent fatty acids of soybean oil.
Figure 1C:
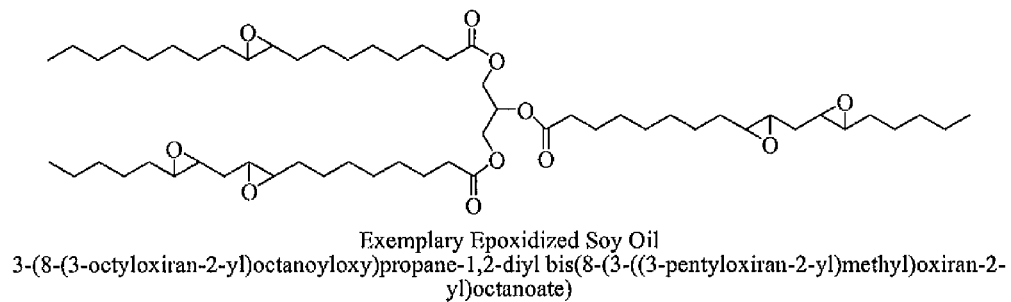
FIG. 1C is a diagram of a chemical structure of an exemplary epoxidized soybean oil.

The epoxidized oil may be further defined as an epoxidized soybean oil. As is known in the art, soybean oils are common vegetable oils and typically include unsaturated fatty acid chains such as linolenic acid chains, linoleic acid chains, and oleic acid chains, and saturated fatty acid chains such as stearic acid chains and palmitic acid chains, as shown in FIGS. 1A and 1B. In one embodiment, the epoxidized soybean oil includes 2-(8-(3-((3-hexyloxiran-2-yl)methyl)oxiran-2-yl)octanoyloxy)-3-(8-(3-((3-pentyloxiran-2-yl)methyl)oxiran-2-yl)octanoyloxy)propyl8-(3-octyloxiran-2-yl) octanoate, as shown in FIG. 1C. The epoxidized soybean oil may have numerous epoxy groups but is not limited to a certain number of epoxy groups per molecule, so long as the soybean oil includes at least one epoxy group. In various embodiments, the epoxidized soybean oil has one, two, three, four, or five internal epoxy groups. Of course, it is to be understood that the epoxidized oil may have more than five internal (or terminal) epoxy groups. It is believed that, in one embodiment, the soybean oil is approximately 100 percent epoxidized and has the following approximate characteristics relative to constituent fatty acid chains:

| Constituent Fatty Acid Chains | Number Average Molecular Weight (g/mol) | Average Weight Percent of Constituent Fatty Acid Chains in Epoxidized Soybean Oil (%) | Number of Additional Oxygen Atoms Added During Epoxidation |
|---|---|---|---|
| Palmitic Acid | 256.4 | 10.41 | 0 |
| Stearic Acid | 284.5 | 4.03 | 0 |
| Oleic Acid | 298.5 | 23.67 | 1 |
| Linoleic Acid | 312.5 | 54.41 | 2 |
| Linolenic Acid | 326.0 | 7.47 | 3 |

Additionally, in this embodiment, the epoxidized soybean oil has a number average molecular weight of about 944 g/mol, a weight average molecular weight of about 947 g/mol, a number average number of oxygen atoms per fatty acid chain of about 1.5, a weight average number of oxygen atoms per fatty acid chain of about 1.55, a total number of oxygen atoms per epoxidized soybean oil molecule of from about 4.49 to 4.65, a number average oxygen content in the epoxidized soybean oil of about 7.62 percent, and a weight average oxygen content in the epoxidized soybean oil of about 7.85 percent. One suitable epoxidized soybean oil is commercially available from Arkema, Inc. of King of Prussia, Pa.

The epoxidized oil may be combined with a non-epoxidized oil including, but not limited to, those non-limiting examples of oils described above. If the epoxidized oil is combined with the non-epoxidized oil, the combination preferably includes at least 50%, and more preferably includes at least 75%, by weight of the epoxidized oil.

The epoxidized oil may be reacted with an additional polyol, such as glycerine, under transesterification conditions. Suitable transesterification conditions include the use of an elevated temperature (such as from 70° C. to 180° C.) and the use of a transesterification catalyst such as a Lewis acid, tin and/or titanium compounds. The reaction of the epoxidized oil and the additional polyol typically forms a mixture of glycerides (mainly mono- or di-glycerides) and esters of fatty acids. In one embodiment, the oil, prior to epoxidation, is reacted with the additional polyol to form a mixture of oil-ester compounds, which are then epoxidized.

The additional polyol may include from 2 to 8 hydroxyl groups per molecule. More preferably, the additional polyol includes from 2 to 4, and most preferably includes from 3 to 4, hydroxyl groups per molecule. Mixtures of additional polyols may also be utilized. The hydroxyl equivalent weight of the additional polyol is preferably less than 150 and more preferably less than 75. Non-limiting examples of suitable additional polyols include glycerine, trimethylolpropane, ethylene glycol, propylene glycol, 1,4-butane diol, polymers of propylene glycol and/or ethylene glycol, pentaerythritol, sorbitol, sucrose, triethanolamine, triisopropanolamine, cyclohexane dimethanol, and combinations thereof. Alkoxylates of any of the foregoing, such as ethoxylates and/or propoxylates, can also be used. The additional polyols, or portions thereof, may also be esterified. In one embodiment, less than all of the hydroxyl groups of the additional polyols are esterified. Alternatively, all of the hydroxyl groups may be esterified.

As first described above, the epoxidized oil is reacted with an organic acid to form the polyol. The organic acid may be any known in the art that includes at least one carbon atom. In one embodiment, the organic acid is further defined as a carboxylic acid. In another embodiment, the organic acid includes a $C_1$-$C_{10}$ carbon chain and may be selected from the group of formic acid, acetic acid, propionic acid, butyric acid, valeric acid, caproic acid, caprylic acid, capric acid, lactic acid, glycolic acid, 2-ethylcaproic acid, 2,2-dimethylolpropionic acid, 2-ethylhexanoic acid, hydroxybenzoic acid, and combinations thereof. Alternatively, the organic acid may include more than 10 carbon atoms, may be a saturated or unsaturated carboxylic acid, and may be selected from the group of lauric acid, myristic acid, palmitic acid, stearic acid, oleic acid, linolenic acid, linoleic acid, acids including fatty acid chains having at least one hydroxyl-functional ester group, and combinations thereof. It is also contemplated that the organic acid may be selected from the group of lactic acid, glycolic acid, 2,2-dimethylolpropionic acid, a fatty acid chain having at least one hydroxyl-functional ester group, and combinations thereof.

In one embodiment, the organic acid is further defined as 2-ethylhexanoic acid. For descriptive purposes only, a general chemical structure of 2-ethylhexanoic acid is shown below:

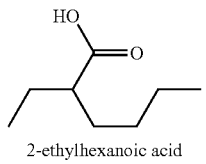

2-ethylhexanoic acid

In another embodiment, the organic acid is further defined as 2,2-dimethylolpropionic acid. For descriptive purposes only, a general chemical structure of 2,2-dimethylolpropionic acid is shown below:

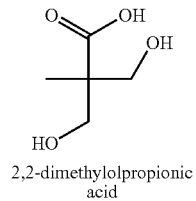

2,2-dimethylolpropionic acid

In yet another embodiment, the organic acid is further defined as oleic acid. A chemical structure of oleic acid is shown in FIG. 1B.

As is known in the art, carboxylic acids include a carboxyl group (COOH). In one embodiment, the carboxylic acid has two hydroxyl groups, i.e., an additional hydroxyl group. In another embodiment, the carboxylic acid has three hydroxyl groups.

The organic acid may also include inorganic atoms such as silicon, i.e., at least one silicon atom. Alternatively, the organic acid may include at least one halogen atom. Suitable organic acids including at least one halogen atom include, but are not limited to, haloalkane based acids, haloalkene based acids, haloaromatic based acids, acids such as haloacetic acids, e.g. chloroacetic acid, organic acids including one or two halogen groups, and combinations thereof. Additionally, it is contemplated that any of the aforementioned organic acids may be modified to include at least one silicon or halogen atom and be used in the instant invention. Alternatively, the organic acid may include a compound that reacts or decomposes to form the organic acid. Suitable non-limiting examples of such compounds include lactides, glycolides, and combinations thereof.

Preferably the epoxidized oil and the organic acid are reacted in a mole ratio of from 0.25 to 1.2, more preferably of from 0.5 to 1, and most preferably of from 0.75 to 1, moles of organic acid to one mole of epoxidized oil. Without intending to be bound by any particular theory, it is believed that increasing a molar amount of the organic acid increases a number of epoxy groups that are opened through a ring opening reaction. Conversely, it is believed that lowering a molar amount of the organic acid may increase cross-linking of epoxy groups and/or viscosity of the polyol. Thus, the molar amounts of the organic acid to be used in forming the polyol may be chosen by one of skill in the art based on desired physical properties of the polyol. Additionally, it is believed that, to increase a speed of reaction of the epoxidized oil and the organic acid, strong organic acids known in the art may be used. However, weaker organic acids may also be used, as chosen by one of skill in the art.

The epoxidized oil and the organic acid are reacted in the presence of the Lewis base catalyst, as first described above. As is understood by those of skill in the art, the Lewis base catalyst does not substantially react with either the epoxidized oil or the organic acid. Of course, the Lewis base catalyst may be protonated and/or deprotonated in the instant invention. However, for purposes of this invention, this protonation/deprotonation is not a reaction because these products typically are not stable.

The Lewis base catalyst includes at least one of a phosphorous atom or a nitrogen atom. In other words, the Lewis base catalyst may include a nitrogen atom to the exclusion of a phosphorous atom, a phosphorous atom to the exclusion of a nitrogen atom, or a nitrogen atom and a phosphorous atom. In one embodiment, the Lewis base catalyst is further defined as an amine. In another embodiment, the Lewis base catalyst is further defined as a phosphine. Suitable non-limiting examples of Lewis base catalysts include triethylenediamine (also known as 1,4-diazabicyclo[2.2.2]octane and DABCO), DBU (1,8-diazabicyclo[5.4.0]undec-7-ene), DBN (1,5-diazabicyclo[4.3.0]non-5-ene), 1,3,3-trimethyl-6-azabicyclo [3.2.1]octane, hexamethylenetetramine, N-(2-cyanoethyl) morpholine), N-acetylmorpholine, N,N'-dimethylpiperazine, 1,4-dimethyl-1H-pyrazole, 2,2'dimorpholinediethylether, 2,4,6-(dimethylaminomethyl)phenol, N,N-ethyldiisopropylamine, N-ethylmorpholine, N-formylmorpholine, N-methylpiperazine, N-methyl-1H-pyrrole, 1,3,5-(dimethylaminopropyl)-1,3,5-hexahydrotriazine, tris(2-ethylhexyl)amine, $Ph_3P$, $PhPEt_2$, $PhPMe_2$, $Ph_2P(CH_2CH_2CN)$, PhP $(CH_2CH_2CN)_2$, $(2,4,6\text{-}(OMe)_3C_6H_2)_3P$, $(4\text{-}F\text{---}C_6H_4)_3P$, $(4\text{-}CF_3\text{---}C_6H_4)_3P$, $P(CH_2CH_2CN)_3$, $Me_2PCH_2CH_2CN$, bis(diphenylphosphino)methane, bis(diphenylphosphino) ethane), and combinations thereof. In one embodiment, the Lewis base catalyst is selected from the group of triphenylphosphine, triethylenediamine, and combinations thereof. For descriptive purposes only, chemical structures of triphenylphosphine and triethylenediamine are shown below:

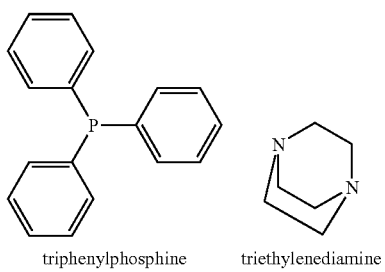

triphenylphosphine    triethylenediamine

The epoxidized oil and the organic acid are preferably reacted in the presence of the Lewis base catalyst in an amount of from 0.1 to 1, more preferably in an amount of from 0.15 to 0.5, and most preferably in an amount of from 0.15 to 0.25, parts by weight per 100 parts by weight of the epoxidized oil and the organic acid.

Figure 2:
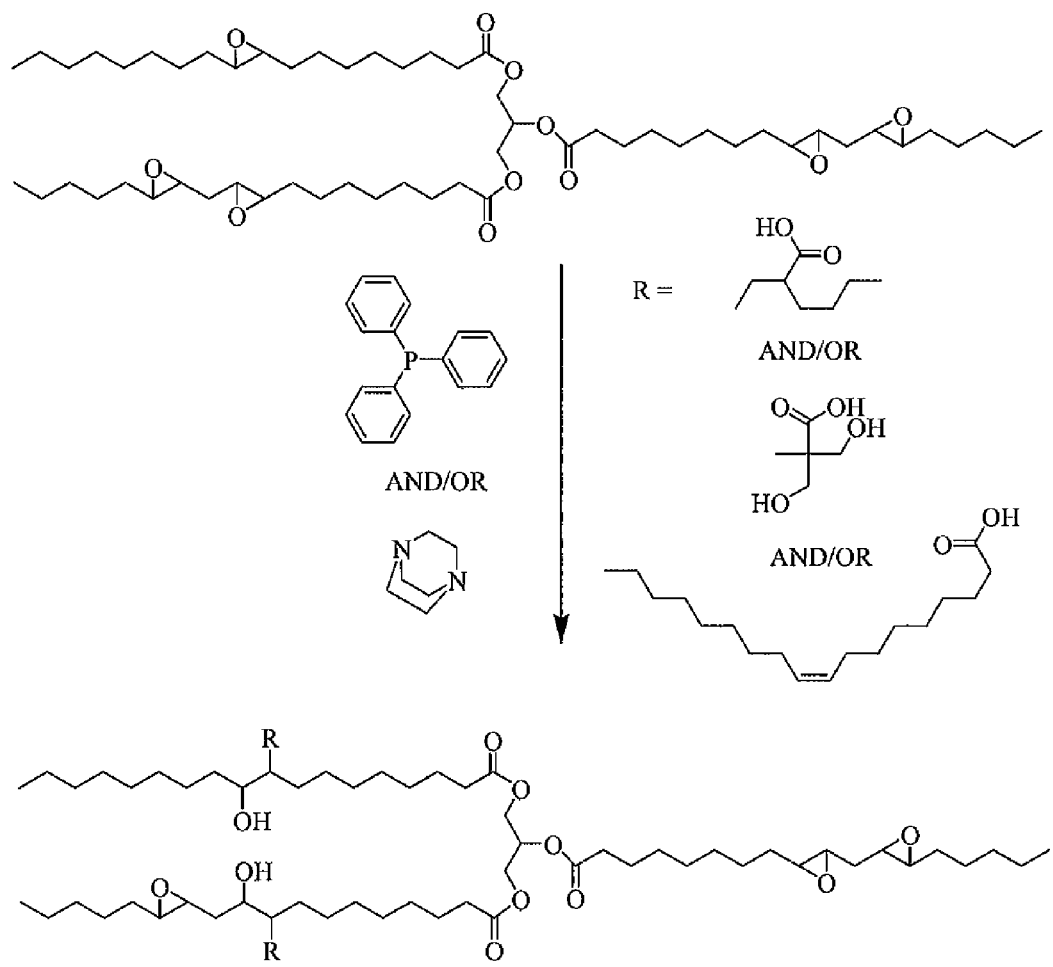
FIG. 2 is an exemplary reaction scheme of the instant invention including reaction of an epoxidized soybean oil and an organic acid such as 2-ethylhexanoic acid, 2,2-dimethylolpropionic acid, and/or oleic acid in the presence of a Lewis base catalyst such as triphenylphosphine and/or triethylenediamine to form a polyol of the instant invention.

Without intending to be bound by any particular theory, is it believed that the epoxidized oil reacts with the organic acid in the presence of the Lewis base catalyst in a nucleophilic ring opening reaction to produce hydroxyl groups (i.e., primary, secondary, and/or tertiary hydroxyl moieties) and to add the organic acid to the epoxidized oil. More specifically, it is believed that under Lewis base catalysis, symmetrical epoxy groups may be attacked at either carbon atom while unsymmetrical epoxy groups are preferentially attacked at a less substituted, less sterically hindered carbon atom of the three member ring. Both symmetrical and unsymmetrical epoxy groups are believed to be attacked in a "$S_N1$ like" reaction. The epoxidized oil may react with the organic acid in the presence of the Lewis base catalyst in a reaction scheme as shown in FIG. 2. In one embodiment, the epoxidized oil is further defined as epoxidized soybean oil, the organic acid is further defined as 2-ethylhexanoic acid, and the Lewis base catalyst is further defined as triethylenediamine.

Preferably, the epoxidized oil and the organic acid are reacted in the presence of the Lewis base catalyst at a temperature of from about 50° C. to about 300° C., more preferably at a temperature of from about 100° C. to about 250° C., and most preferably at a temperature of from about 140° C. to about 200° C. In one embodiment, the temperature is about 150° C. In another embodiment, the temperature is about 200° C. The epoxidized oil and the organic acid may be reacted under atmospheric pressure or at increased pressure and may be reacted under a noble gas atmosphere or under a nitrogen atmosphere. It is contemplated that use of shorter chain organic acids, e.g., those having less than or equal to 10 carbon atoms, may allow for use of lower reaction temperatures. Alternatively, use of longer chain organic acids, i.e., those having more than 10 carbon atoms, may benefit from increased reaction temperatures.

The epoxidized oil may be reacted with the organic acid in the presence of the Lewis base catalyst and a solvent. The solvent may be any known in the art and may include a non-polar solvent. Preferably, there is no solvent present. However, one of skill in the art may choose a solvent including, but not limited to, benzene, toluene, a halobenzene such as chlorobenzene, hexane, pentane, and combinations thereof.

The polyol formed in the instant invention typically has a hydroxyl number of from 50 to 400, more typically of from 50 to 200, and most typically of from 60 to 90, mg KOH/g. The polyol also typically has a functionality of up to about 13.2, more typically of from 2 to 6, and most typically of from 2 to 4. Further, the polyol typically has a number average molecular weight of up to 2,200, more typically of from 1,000 to 2,000, and most typically of from 1,200 to 1,500, g/mol. The polyol also typically has a weight average molecular weight of up to 3,000, more typically of from 1,000 to 2,000, and most typically of from 1,500 to 1,900, g/mol. Further, the polyol typically has an acid number of from 1 to 17 and more typically of from 0.1 to 17. Still further, the polyol typically has an oxirane equivalent weight of from 0.1 to 4, more typically of from 1.5 to 2.5, alternatively from 0.3 to 1.5 or from 0.7 to 1.5, grams, determined by titration using methods well known in the art. As is known in the art, an oxirane equivalent weight of 0.1 indicates that almost all of the epoxy groups in the epoxidized oil have reacted in a ring opening reaction. Conversely, an oxirane equivalent weight of 4 indicates that almost none of the epoxy groups in the epoxidized oil have reacted in a ring opening reaction.

Figure 4A:
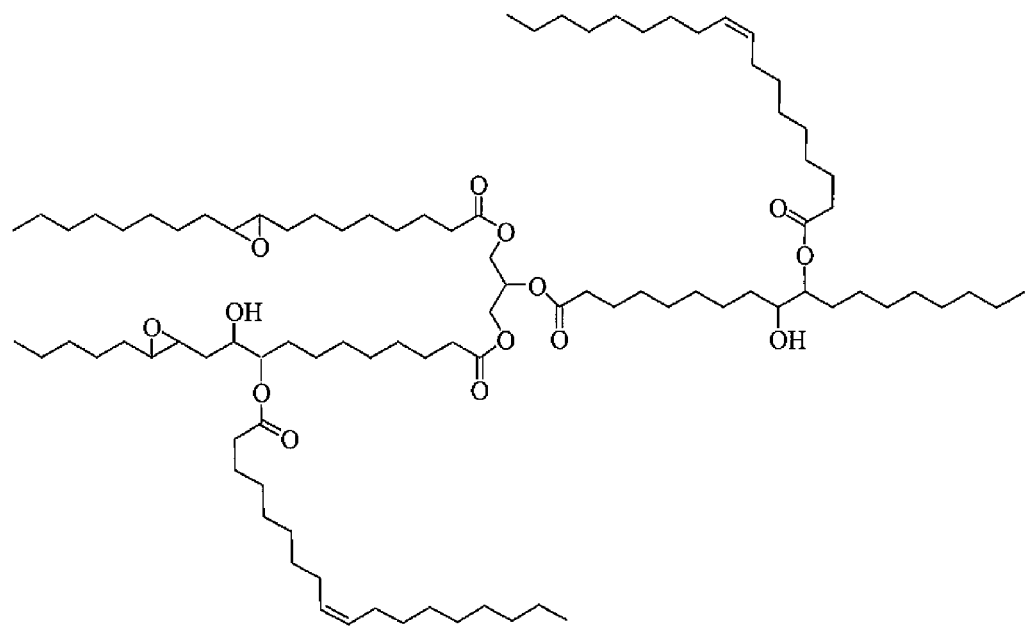
FIG. 4A includes possible structures of the Polyols 1 and 2 of the instant invention and set forth in the Examples.
Figure 4B:
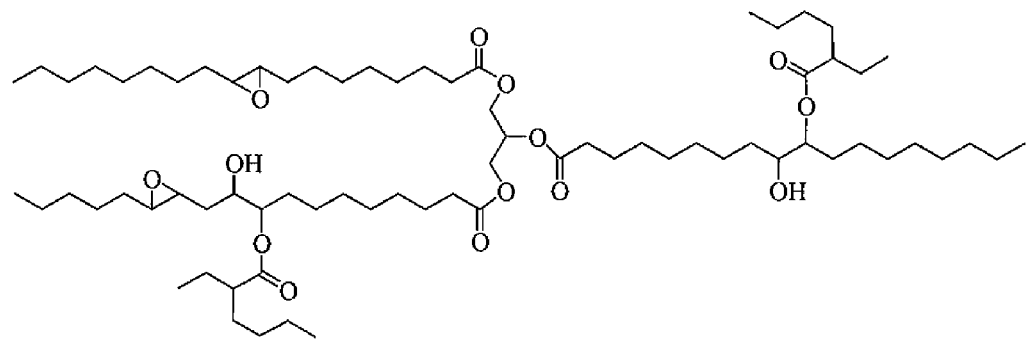
FIG. 4B includes one possible structure of Polyol 3 of the instant invention that is set forth in the Examples.

The polyol also preferably has a viscosity of from 1,200 to 4,000 and more preferably of from 1,600 to 3,700, cps at 25° C. using a Brookfield Viscometer and a 21 spindle. Additionally, the polyol typically has a polydispersity of from 1 to 3, more typically of from 1 to 2.5, and most typically of from 1.2 to 1.5. The polyol may also be formed with an increased or decreased hydrophobicity, i.e., a ratio of carbon atoms to oxygen atoms in the polyol. It is believed that an increased ratio contributes to flame retardancy and an increased number of oxygen atoms leads to increased hydrophilicity. Particularly suitable non-limiting examples of polyols of the instant invention are set forth in FIGS. 4A and 4B and are not intended to limit the instant invention.

The method of forming the polyol, first introduced above, includes the step of reacting the epoxidized oil with the organic acid in the presence of the Lewis base catalyst to form the polyol. The step of reacting may also be accomplished by any way known in the art. In one embodiment, the step of reacting is further defined as reacting the epoxidized oil and the organic acid in a "one-pot" synthesis. For purposes of the instant invention, the terminology "one-pot" means that, in this embodiment, the epoxidized oil is reacted with the organic acid in the presence of the Lewis base catalyst in a single reactor. In an alternative embodiment, the step of reacting is further defined as reacting in a "two" or "multiple" pot synthesis in which two or more reactors are used. For example, a first portion of the epoxidized oil may be reacted with a first portion of the organic acid in the presence of a first portion of the Lewis base catalyst. Similarly, a second or additional portion of the epoxidized oil may be reacted with a second or additional portion of the organic acid in the presence of a second or additional portion of the Lewis base catalyst.

As described above, the step of reacting may occur at a variety of temperatures. That is, the step of reacting may be further defined as reacting at any of the temperatures described above. Further, the step of reacting may occur at a variety of pressures. Typically, the step of reacting occurs at or near atmospheric pressure. However, higher and lower pressures are also contemplated for use in this invention.

Figure 3:
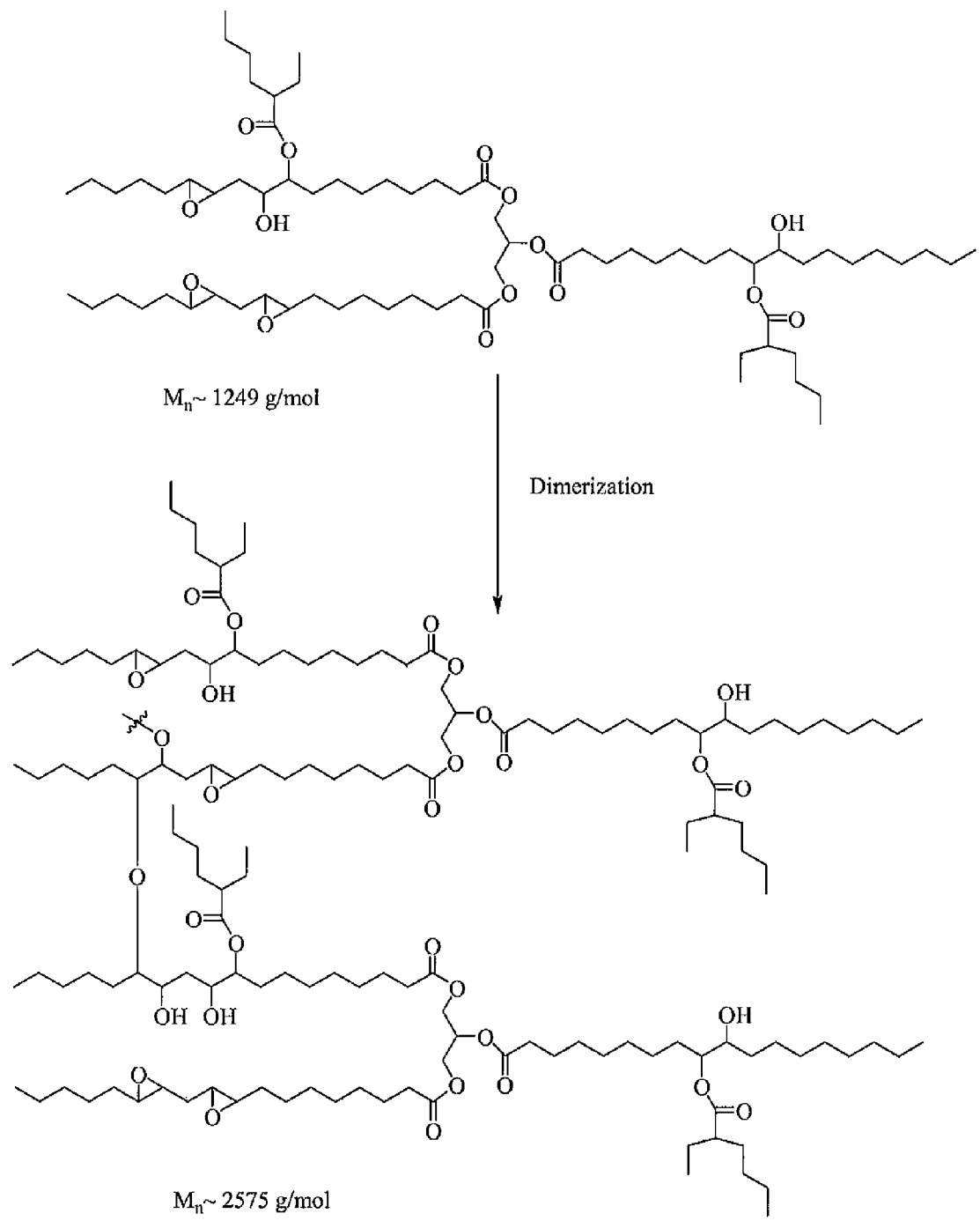
FIG. 3 includes one possible structure of the Comparative Polyol set forth in the Examples and an exemplary reaction scheme of a side reaction which is reduced by the instant invention and which includes dimerization/cross-linking of epoxy groups.

The step of reacting may proceed to completion, i.e., ~100% of the epoxidized oil may react with ~100% of the organic acid. Alternatively, the step of reacting may not proceed to completion and instead may proceed to a percentage less than 99% or 100% completion. In one embodiment, the step of reacting proceeds to less than or equal to about 95% completion. If the reaction proceeds to less than completion, an amount of free organic acid may remain in the polyol. Typically, this amount of free organic acid ranges from greater than zero to 10% by weight. In one embodiment, the polyol includes approximately 5% by weight of free organic acid. The step of reacting preferably yields the polyol in a percentage yield of greater than 90%, more preferably of greater than 94%, and most preferably greater than or equal to 98%. In various embodiments, an amount of undesirable by-products due to side reactions may be from greater than zero to 10% by weight of the polyol. Alternatively, the polyol may be free of undesirable by-products. The cross-linking of non-reacted epoxy groups due to side reactions may occur via a dimerization reaction similar to the one set forth in FIG. 3.

In one embodiment, the method includes the step of providing each of the epoxidized oil, the organic acid, and the Lewis base catalyst, which may be accomplished via any way known in the art. The step of providing may be further defined as adding each of the epoxidized oil, the organic acid, and the Lewis base catalyst into a reactor. The epoxidized oil, the organic acid, and the Lewis base catalyst may be added to the reactor in any order. In one embodiment, the organic acid and the Lewis base catalyst are combined and added to the reactor followed by addition of the epoxidized oil. That is, in this embodiment, the organic acid and the Lewis base catalyst are combined before reaction with the epoxidized oil.

In one embodiment, the method consists essentially of the step of reacting the epoxidized oil with the organic acid in the presence of the Lewis base catalyst to form the polyol. In this embodiment, the method does not include any additional reaction or reaction steps other than the step of reacting the epoxidized oil with the organic acid. In another embodiment, the method consists of the step of reacting. In a further embodiment, the polyol is formed without the need for a "workup" step. As is known in the art, "working up" a reaction may include purification and/or separation of a desired compound from a final product in a reactor. In this embodiment of the invention, the polyol may be used as made in the reactor with no purification or separation steps required. Alternatively, the polyol may be "worked up," if desired.

The method may be completed in a cycle time of from 2 to 14, more preferably of from 2 to 12, and most preferably of from 2 to 6, hours. Without intending to be bound by any particular theory, it is believed that by increasing amounts of the Lewis base catalyst and/or temperature, the cycle time can be reduced.

The present invention also provides a resin composition comprising the polyol of the instant invention. The resin composition may include one or more additional polyols, different from the polyol of the instant invention. These additional polyols may be any known in the art, may be derived from petroleum, and may include graft polyols. The resin composition may also include additives, although additives are not required in the instant invention. The additives may be selected from the group of chain extenders, anti-foaming agents, processing additives, plasticizers, chain terminators, surface-active agents, adhesion promoters, flame retardants, anti-oxidants, water scavengers, fumed silicas, dyes, ultraviolet light stabilizers, fillers, thixotropic agents, silicones, transition metals, catalysts, blowing agents, surfactants, cross-linkers, inert diluents, and combinations thereof. The additives may be included in any amount as desired by those of skill in the art.

The additives may include amines. The additives may alternatively include surfactants to stabilize the resin composition. The surfactants may be anionic, cationic, or non-ionic surfactants or may include mixtures of one or more surfactants. Further, the additives may include a blowing agents and/or blowing catalysts. The blowing catalysts may be used if the polyol is reacted with an isocyanate to form a foamed polyurethane. More specifically, the blowing catalyst may increase a speed of a reaction between the isocyanate and the water that forms carbon dioxide, as is known in the art. Further, the additives may also include gelling catalysts. Gelling catalysts typically promote a reaction between the polyol and the isocyanate to form the polyurethane. Still further, the additive may include a foam surfactant. The foam surfactant may be used to control cell size of polyurethane foams (e.g., flexible polyurethane foams) produced from the reaction of the polyol and the isocyanate.

The present invention also provides a polyurethane including the reaction product of an isocyanate and the polyol of the instant invention. It is also contemplated that the polyurethane may include the reaction product of the isocyanate, the polyol of the present invention, and one or more of the additional polyols of the resin composition, first introduced above. The polyurethane may be a flexible foam, a rigid foam, an elastomer, or a non-foamed elastomer. The polyurethane may also be used in coatings, adhesives, and sealants.

The isocyanate may include any isocyanate known in the art including, but not limited to isocyanates, polyisocyanates, biurets of isocyanates and polyisocyanates, isocyanurates of isocyanates and polyisocyanates, and combinations thereof. In one embodiment of the present invention, the isocyanate includes an n-functional isocyanate. In this embodiment, n is a number preferably from 2 to 5, more preferably from 2 to 4, and most preferably from 3 to 4. It is to be understood that n may be an integer or may have intermediate values from 2 to 5. The isocyanate may include an isocyanate selected from the group of aromatic isocyanates, aliphatic isocyanates, and combinations thereof. In one embodiment, the isocyanate includes an aliphatic isocyanate. If the isocyanate includes an aliphatic isocyanate, the isocyanate may also include a modified multivalent aliphatic isocyanate, i.e., a product which is obtained through chemical reactions of aliphatic diisocyanates and/or aliphatic polyisocyanates. Examples include, but are not limited to, ureas, biurets, allophanates, carbodiimides, uretonimines, isocyanurates, urethane groups, dimers, trimers, and combinations thereof. The isocyanate may also include, but is not limited to, modified diisocyanates employed individually or in reaction products with polyoxyalkyleneglycols, diethylene glycols, dipropylene glycols, polyoxyethylene glycols, polyoxypropylene glycols, polyoxypropylenepolyoxethylene glycols, polyesterols, polycaprolactones, and combinations thereof.

Alternatively, the isocyanate may include an aromatic isocyanate. If the isocyanate includes an aromatic isocyanate, the aromatic isocyanate may correspond to the formula R'(NCO)$_z$ wherein R' is aromatic and z is an integer that corresponds to the valence of R'. Preferably, z is at least two. If the isocyanate includes the aromatic isocyanate, the isocyanate may include, but is not limited to, the tetramethylxylene diisocyanate (TMXDI), 1,4-iisocyanatobenzene, 1,3-diisocyanato-o-xylene, 1,3-diisocyanato-p-xylene, 1,3-diisocyanato-m-xylene, 2,4-diisocyanato-1-chlorobenzene, 2,4-diisocyanato-1-nitro-benzene, 2,5-diisocyanato-1-nitrobenzene, m-phenylene diisocyanate, p-phenylene diisocyanate, 2,4-toluene diisocyanate, 2,6-toluene diisocyanate, mixtures of 2,4- and 2,6-toluene diisocyanate, 1,5-naphthalene diisocyanate, 1-methoxy-2,4-phenylene diisocyanate, 4,4'-diphenylmethane diisocyanate, 2,4'-diphenylmethane diisocyanate, 4,4'-biphenylene diisocyanate, 3,3'-dimethyl-4, 4'-diphenylmethane diisocyanate, 3,3'-dimethyldiphenylmethane-4,4'-diisocyanate, triisocyanates such as 4,4',4"-triphenylmethane triisocyanate polymethylene polyphenylene polyisocyanate and 2,4,6-toluene triisocyanate, tetraisocyanates such as 4,4'-dimethyl-2,2'-5,5'-diphenylmethane tetraisocyanate, toluene diisocyanate, 2,2'-diphenylmethane diisocyanate, 2,4'-diphenylmethane diisocyanate, 4,4'-diphenylmethane diisocyanate, polymethylene polyphenylene polyisocyanate, corresponding isomeric mixtures thereof, and combinations thereof. Alternatively, the aromatic isocyanate may include a triisocyanate product of m-TMXDI and 1,1,1-trimethylolpropane, a reaction product of toluene diisocyanate and 1,1,1-trimethyolpropane, and combinations thereof.

The isocyanate may have any % NCO content and any viscosity. The isocyanate may also react with the polyol in any amount, as determined by one skilled in the art. Preferably, the isocyanate and the polyol of the instant invention are reacted at an isocyanate index from 90 to 115, more preferably from 95 to 105, and alternatively from 105 to 110. The isocyanate may also include any of the additives described above, in amounts determined by one of skill in the art.

EXAMPLES

Three polyols (Polyols 1-3) are formed according to the instant invention. Specifically, to form each of the Polyols 1-3, an amount of an Epoxidized Oil is reacted with an amount of an Organic Acid in the presence of a Lewis Base Catalyst. Two Comparative Polyols (Comparative Polyols 1 and 2) are also formed but not according to the instant invention. To form the Comparative Polyol 1, an amount of the Epoxidized Oil and the Organic Acid are reacted. No Lewis Base Catalyst is used to form the Comparative Polyol 1. To form the Comparative Polyol 2, an amount of the Epoxidized Oil and the Organic Acid are reacted in the presence of water, which is used as a Lewis Base Catalyst that does not include any phosphorous or nitrogen atoms. The amounts of each of the Epoxidized Oil, the Organic Acid, and the Lewis Base Catalyst are set forth in Table 1 below wherein all amounts are in grams unless otherwise indicated. After formation, each of the Polyols 1-3 and the Comparative Polyols 1 and 2 are characterized to determine hydroxyl number, acid number, oxirane equivalent weight, viscosity of the Polyol and residual organic acid, color, polydispersity, and percent yield, which are also set forth in Table 1 below.

Formation of Polyol 1:

To form Polyol 1, 147.5 grams of oleic acid as the Organic Acid and 0.76 grams of 1,4-diazabicyclo[2.2.2]-octane (DABCO) as the Lewis Base Catalyst are added to a reaction flask to form a mixture. The reaction flask is equipped with temperature control, stirrer, reflux condenser, and an additional funnel. The mixture is then heated to approximately 80° C. under a nitrogen ($N_2$) atmosphere. The temperature is held at 80° C. while 250 grams of epoxidized soybean oil (commercially available from Arkema, Inc. of King of Prussia, Pa.) are added to the mixture. The mixture is then thoroughly mixed and heated to approximately 200° C. and held at this temperature for approximately 6 hours. After 6 hours, the temperature of the mixture is lowered to approximately 130° C., and a vacuum is applied to reduce any residual water that may form. There is no additional workup of this reaction. After the vacuum is applied, a pale yellow liquid including Polyol 1 is obtained.

Formation of Polyol 2:

To form Polyol 2, 147.5 grams of oleic acid as the Organic Acid and 250 grams of epoxidized soybean oil are reacted in the presence of 1.35 grams of triphenylphosphine, as the Lewis Base Catalyst, using the same method described immediately above. Polyol 2 is characterized in the same ways described above relative to Polyol 1.

Formation of Polyol 3:

To form Polyol 3, 150.6 grams of 2-ethylhexanoic acid as the Organic Acid and 500 grams of epoxidized soybean oil are reacted in the presence of 1.24 grams of 1,4-diazabicyclo [2.2.2]-octane (DABCO), as the Lewis Base Catalyst, using the same method described above for Polyol 1. Polyol 3 is characterized in the same ways described above relative to Polyol 1.

Formation of Comparative Polyol 1:

To form the Comparative Polyol 1, 150.6 grams 2-ethylhexanoic acid as the Organic Acid is added to a reaction flask to and heated to approximately 80° C. under a nitrogen ($N_2$) atmosphere. 500 grams epoxidized soybean oil is then added to form a mixture. The mixture is then thoroughly mixed and heated to approximately 150° C. and held for 6 hours. After 6 hours, the temperature of the mixture is lowered and a vacuum is applied to reduce any residual water that may form. After the vacuum is applied, a pale yellow liquid including the Comparative Polyol 1 is obtained.

Formation of Comparative Polyol 2:

To form Comparative Polyol 2, 150.6 grams of 2-ethylhexanoic acid as the Organic Acid and 1.24 grams of distilled water as a Lewis Base Catalyst that does not include any phosphorous or nitrogen atoms are added to a reaction flask to form a mixture. The reaction flask is equipped with temperature control, stirrer, reflux condenser, and an additional funnel. The mixture is then heated to approximately 80° C. under a nitrogen ($N_2$) atmosphere. The temperature is held at 80° C. while 500 grams of epoxidized soybean oil (commercially available from Arkema, Inc. of King of Prussia, Pa.) are added to the mixture. The mixture is then thoroughly mixed and heated to approximately 200° C. and held at this temperature for approximately 6 hours. After 6 hours, the temperature of the mixture is lowered to approximately 130° C., and a vacuum is applied to reduce any residual water that may form. There is no additional workup of this reaction. After the vacuum is applied, a pale yellow liquid including Comparative Polyol 2 is obtained.

TABLE 1

|  | Polyol 1 | Polyol 2 | Polyol 3 | Comparative Polyol 1 | Comparative Polyol 2 |
| --- | --- | --- | --- | --- | --- |
| Epoxidized Soybean Oil | 250 | 250 | 500 | 500 | 500 |
| Oleic Acid | 147.5 | 147.5 | — | — | — |
| 2-Ethylhexanoic Acid | — | — | 150.6 | 150.6 | 150.6 |
| DABCO | 0.76 | — | 1.24 | — | — |
| Triphenylphosphine | — | 1.35 | — | — | — |
| Water | — | — | — | — | 1.24 |
| Uncorrected Hydroxyl Number (mg KOH/g) | 64.6 | 80.6 | 105.5 | 90.2 | 118.9 |

TABLE 1-continued

|  | Polyol 1 | Polyol 2 | Polyol 3 | Comparative Polyol 1 | Comparative Polyol 2 |
|---|---|---|---|---|---|
| Acid Number (mg KOH/g) | 0.62 | 2.54 | 7.7 | 15.9 | 12.8 |
| Oxirane Equivalent Weight | 0.60 | 0.44 | 0.93 | 0.80 | 0.85 |
| Viscosity of the Polyol + Residual Organic Acid (mPa·s at 25° C.) | 1,760 | 2,070 | 3,380 | 4,210 | 4,190 |
| Viscosity of the Polyol (mPa·s at 25° C.) | >1,760 | >2,070 | >3,380 | >4,210 | >4,190 |
| Color | Yellow | Yellow | Yellow | Yellow | Yellow |
| Polydispersity | 1.2 | 1.2 | 1.2 | 1.5 | 2.19 |
| % Yield | >98 | >98 | >98 | >98 | >98 |

Functionality, Hydroxyl Number, Acid Number, Oxirane Equivalent Weight, Viscosity, and Polydispersity are all determined by standard methods well known in the art. Color is determined visually. Without intending to be bound by any particular theory, it is hypothesized that Polyols 1-3 have approximate chemical structures as set forth in FIGS. 4A and 4B. It is also hypothesized that the Comparative Polyols 1 and 2 have an approximate chemical structure as set forth in FIG. 3.

The only difference in the Polyols 1-3 and the Comparative Polyols 1 and 2 is the use of the Lewis Base Catalyst of the instant invention in the method of forming the Polyols. The Comparative Polyol 1 is formed with no catalyst whatsoever. The Comparative Polyol 2 is formed using water as a Lewis Base Catalyst that does not include any phosphorous or nitrogen atoms. As the data set forth in Table 1 demonstrates, the Acid Numbers of the Comparative Polyols 1 and 2 are higher than the Acid Numbers of the Polyols 1-3. This indicates that the reactions to form the Comparative Polyols 1 and 2 are not completed and that residual Organic Acid is present in the Comparative Polyols 1 and 2. More specifically, the reaction to form the Polyols 1-3 proceeds further towards completion than the reactions that form the Comparative Polyols 1 and 2.

The amount of residual Organic Acid present in the Polyols is related to viscosity. Viscosity is measured and reported in two ways in Table 1 above. The first measurement of viscosity represents the viscosity of the Polyol and any residual Organic Acid and is reported in mPa·s at 25° C. Without intending to be bound by any particular theory, it is believed that the residual Organic Acid acts as an internal diluent and reduces this viscosity measurement. The Comparative Polyols 1 and 2 have higher acid numbers, and therefore have more residual Organic Acid, than Polyols 1-3 of the instant invention. Thus, the Comparative Polyols 1 and 2 have more "internal diluent" yet still have a higher viscosity than Polyols 1-3. It is believed that, even without the "internal diluent," the Comparative Polyols 1 and 2 themselves are highly crosslinked, viscous, and undesirable.

The second measurement of viscosity represents the viscosity of the Polyols themselves, without any residual Organic Acid. As the data in Table 1 show, the viscosities of the Polyols themselves are higher than when they include amounts of the Residual Organic Acid. The formation of byproducts affects the final polydispersity of the Polyols and the viscosity, as described above. Narrowed polydispersity indices indicate that a more consistent final product (polyol) is formed. The data above shows that the Polydispersity Indices of the Comparative Polyols 1 and 2 are higher than those of the Polyols 1-3. This means that the reactions that form the Comparative Polyols 1 and 2 are not as efficient as the reactions that form the Polyols 1-3 and produce more byproducts, which are undesirable. Thus, the reactions that form the Polyols 1-3 are more accurate and more efficient.

Overall, the instant invention, which utilizes the Lewis Base Catalyst, produces polyols in an efficient, accurate, and consistent manner as compared with the Comparative Polyols 1 and 2 and does so while minimizing formation of cross-linked structures and producing less viscous polyols with narrowed ranges of polydispersity indices. This allows polyols to be customized and manipulated based on market trends and needs of individual users. This also allows polyols to be more easily used in commercial equipment due to the lower viscosities.

Additionally, a series of flexible foams (Foams 1-4) are formed using Polyol 1 of the instant invention. A comparative foam (Comparative Foam 1) is also formed using a petroleum based polyol that is not of the instant invention. More specifically, these Foams are formed using methods well known in the art and include the formulations set forth in Table 2 below wherein all amounts are in grams unless otherwise indicated.

TABLE 2

|  | Comparative Foam 1 | Foam 1 | Foam 2 | Foam 3 | Foam 4 |
|---|---|---|---|---|---|
| Petroleum Based Polyol | 100.0 | 95.0 | 90.0 | 80.0 | 60.0 |
| Polyol 1 | — | 5.0 | 10.0 | 20.0 | 40.0 |
| Silicone Surfactant | 1.0 | 1.0 | 1.0 | 1.0 | 1.1 |
| Gel Catalyst | 0.21 | 0.21 | 0.21 | 0.21 | 0.21 |
| Blowing Catalyst | 0.03 | 0.03 | 0.03 | 0.03 | 0.03 |
| Tin Catalyst | 0.45 | 0.45 | 0.45 | 0.45 | 0.5 |
| Water | 3.15 | 3.15 | 3.15 | 3.15 | 3.15 |
| Isocyanate, pbw | 43.13 | 43.33 | 43.54 | 43.95 | 44.77 |
| TDI Index | 110 | 110 | 110 | 110 | 110 |

The Petroleum Based Polyol is a trifunctional polyether polyol having an OH Number of 56 mg KOH/g.

The Polyol 1 is the same as Polyol 1 set forth in Table 1.

The Silicone Surfactant is commercially available from Union Carbide Chemicals and Plastics Company, Inc. under the trade name of Niax® Silicone L-620.

The Gel Catalyst is commercially available under the trade name Dabco® 33LV.

The Blowing Catalyst is commercially available under the trade name Dabco® BL11.

The Tin Catalyst is commercially available under the trade name Dabco® T-10.

The Isocyanate is toluene diisocyanate commercially available from BASF Corporation.

After formation, each of the Foams 1-4 and the Comparative Foam 1 is evaluated using ASTM D3574 to determine Density, Tear Strength, Falling Ball Resilience, Indentation Force Deflection, Sag Factor, Recovery Percentage, Air Flow, and Compression Force Deflection. The results of each of these determinations are set forth in Table 3 below.

TABLE 3

| | Comparative Foam 1 | Foam 1 | Foam 2 | Foam 3 | Foam 4 |
|---|---|---|---|---|---|
| Density (pcf) | 1.81 | 1.80 | 1.83 | 1.75 | 1.84 |
| Tear Strength (pi) | 1.7 | 2.0 | 2.0 | 2.0 | 1.5 |
| Falling Ball Resilience (%) | 38 | 44 | 39 | 33 | 41 |
| Indentation Force Deflection (Lbs; 4 inch) | | | | | |
| 25% Deflection | 43.5 | 40.8 | 39.7 | 33.0 | 44.7 |
| 65% Deflection | 76.4 | 73.0 | 71.8 | 64.6 | 79.7 |
| Sag Factor | 1.76 | 1.79 | 1.81 | 1.95 | 1.78 |
| Recovery (%) | 73 | 74 | 73 | 69 | 73 |
| AirFlow (cfm) | 0.7 | 1.7 | 2.5 | 4.2 | 0.4 |
| Compression Force Deflection % (of Orig. 50% Compression) | 70 | 76 | 79 | 82 | 73 |

As the results in Table 3 demonstrate, the Foams 1-4 produced using the polyol of the instant invention generally perform the same or better than the Comparative Foam 1 produced using the commercially available petroleum based polyol. Specifically, the Foams 1-4 consistently exhibit greater tear strengths than the Comparative Foam 1. These results also demonstrate that the polyols of the instant invention can be used to replace traditional petroleum based polyols resulting in minimized production costs and a reduced use of petroleum.

The invention has been described in an illustrative manner, and it is to be understood that the terminology which has been used is intended to be in the nature of words of description rather than of limitation. Obviously, many modifications and variations of the present invention are possible in light of the above teachings, and the invention may be practiced otherwise than as specifically described.

What is claimed is:

1. A method of forming a polyol comprising the step of reacting an epoxidized triglyceride soybean oil and an organic acid in the presence of a Lewis base catalyst comprising at least one of a phosphorous atom or a nitrogen atom to form the polyol wherein the polyol has a viscosity of from 1,200 to 4,000 cps at 25° C., and wherein the polyol has the following structure:

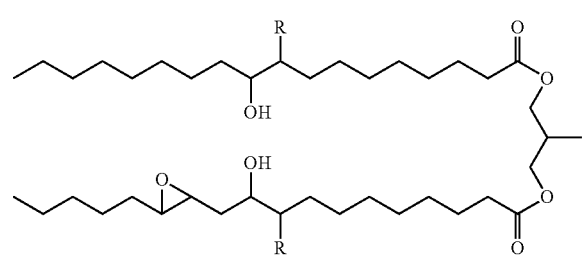

-continued

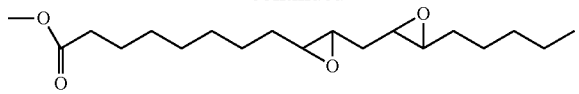

wherein R is an acid ester moiety derived from said organic acid.

2. A method as set forth in claim 1 wherein the Lewis base catalyst is further defined as triethylenediamine.

3. A method as set forth in claim 1 wherein the Lewis base catalyst is further defined as triphenylphosphine.

4. A method as set forth in claim 1 wherein the organic acid is reacted in a molar ratio of from 0.5 to 1 moles of the organic acid per mole of the epoxidized triglyceride soybean oil.

5. A method as set forth in claim 1 wherein the Lewis base catalyst and the organic acid are combined before reaction of the organic acid and the epoxidized triglyceride soybean oil.

6. A method as set forth in claim 1 consisting essentially of the step of reacting the epoxidized triglyceride soybean oil and the organic acid in the presence of the Lewis base catalyst to form the polyol.

7. A method as set forth in claim 1 consisting of the step of reacting the epoxidized triglyceride soybean oil and the organic acid in the presence of the Lewis base catalyst to form the polyol.

8. A method of forming a polyol, said method consisting essentially of the steps of:
   A. providing an epoxidized triglyceride soybean oil;
   B. providing an organic acid selected from the group of 2-ethylhexanoic acid, oleic acid, 2,2-dimethylolpropionic acid, and combinations thereof in a mole ratio of from 0.5 to 1 mole of the organic acid per mole of the epoxidized triglyceride soybean oil;
   C. providing a Lewis base catalyst selected from the group of triethylenediamine, triphenylphosphine, and combinations thereof; and
   D. reacting the epoxidized triglyceride soybean oil and the organic acid in the presence of the Lewis base catalyst at a temperature of from 140° C. to 200° C. to form the polyol wherein the polyol has a viscosity of from 1,200 to 4,000 cps at 25° C., wherein the polyol has the following structure:

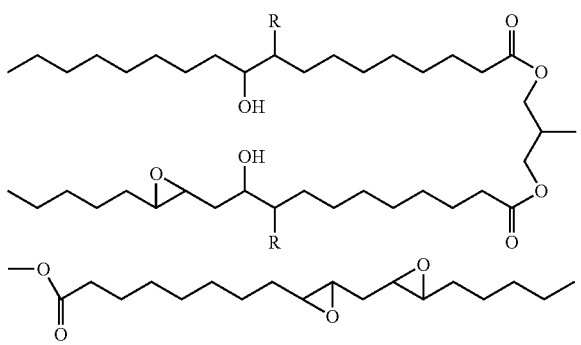

and wherein each R is independently selected from the group of:

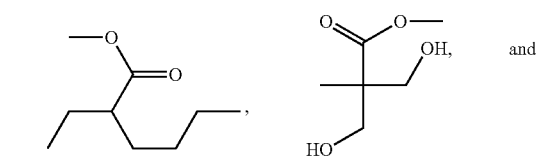

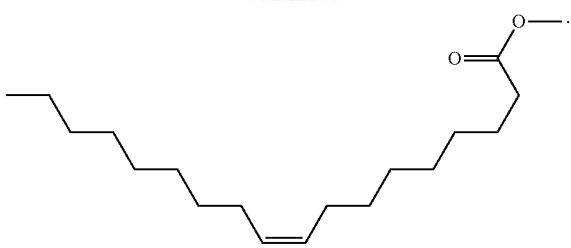

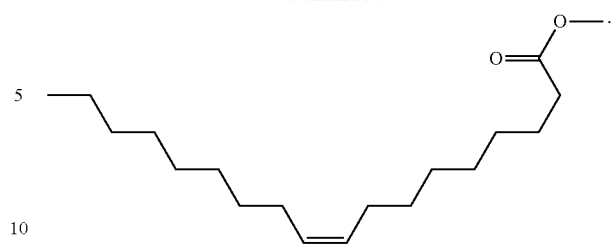

9. A method as set forth in claim 1 wherein each R is independently selected from the group of:

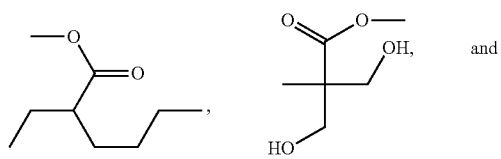

10. A method as set forth in claim 9 wherein the polyol has a polydispersity of from 1.2 to 1.5.

11. A method as set forth in claim 1 wherein the polyol has a polydispersity of from 1.2 to 1.5.

12. A method as set forth in claim 1 wherein the organic acid is selected from the group of 2-ethylhexanoic acid, oleic acid, 2,2-dimethylolpropionic acid, and combinations thereof.

* * * * *